PORTABLE COLOR TELEVISION CAMERA SYSTEM

Filed Oct. 18, 1967 2 Sheets-Sheet 1

INVENTORS
WALTER G. GIBSON &
ARTHUR J. GRAVEL
BY Eugene M. Whitacre
ATTORNEY

June 30, 1970 W. G. GIBSON ET AL 3,518,360

PORTABLE COLOR TELEVISION CAMERA SYSTEM

Filed Oct. 18, 1967 2 Sheets-Sheet 2

INVENTORS
WALTER G. GIBSON &
ARTHUR J. GRAVEL
BY Eugene M. Whitacre
ATTORNEY

United States Patent Office 3,518,360
Patented June 30, 1970

3,518,360

PORTABLE COLOR TELEVISION CAMERA SYSTEM

Walter G. Gibson, Princeton, N.J., and Arthur J. Gravel, Maple Glen, Pa., assignors to RCA Corporation, a corporation of Delaware Filed Oct. 18, 1967, Ser. No. 678,481
Int. Cl. H04h 9/40
U.S. Cl. 178—5.2 3 Claims

ABSTRACT OF THE DISCLOSURE

There is disclosed apparatus for reducing the effective bandwidth required for transmitting color television broadcasting information from a remote camera to a base station such as a television studio, where the color signal is received and further processed for retransmission to the viewing public.

A major portion of the disclosure is concerned with a remote camera operating in accordance with the disclosed apparatus which camera uses red, blue and green sensors of which, the red and blue sensors are activated only on alternate scanning lines in an odd line-interlaced raster and each of the resulting signals is repetitively transmitted in two successive line scanning periods with the alternate red and blue sensor activation being reversed after each frame of two line-interlaced fields and with the vertical sawtooth deflection of the scanning beams of the red and blue sensors being slightly shifted oppositely in respective odd- and even-line fields.

The color signal thus obtained from the camera is modulated by a radio frequency carrier and is transmitted to the remote station. The remote station is adapted to receive the radio frequency carrier demodulate it and retrieve the color information impressed thereon. The receiving apparatus at the base station also serves to delay a portion of the demodulated signal containing the composite red and blue information by one horizontal line scanning interval, to provide a further signal which together with the composite signal allows one to retrieve the original red and blue signals present in the original scene, during a proper line scanning interval.

It is often desirable in the coverage of certain events such as national political conventions, for example, to derive pictures and oral interviews from various parts of the convention floor by means of portable television apparatus. Maximum flexibility in such coverage of events of the character described may be obtained by means of portable camera apparatus carried by a single operator. It is, however, impractical to convey signals from such a portable camera to base station by means of interconnecting cables. It is, therefore, more convenient to provide such a connection by means of a radio link. Such facilities have in the past been provided for black and white television coverage of this character; in which case, it was necessary only to convey a single video signal from the portable camera to the base station and to provide the other necessary control signals.

In order to provide portable camera facilities of such a character for the derivation of color television signals, it is necessary to convey from the camera to the base station more than one video signal in order to transmit the desired color information. At the same time it is desirable to minimize the bandwidth requirements of the transmission facilities between the camera and the base station and, also, to provide maximum sensitivity for the portable camera in order to minimize the power requirements for the camera and, thereby, lighten the load on the camera operator, who must also carry a power supply and other apparatus on his person.

It, therefore, is an object of this invention to provide a mode of operation of a portable color television camera which will enable the transmission of suitable video signals to a base station with a minimum of requirements for transmission bandwidth, power and the like, and with maximum sensitivity of the pickup facilities of the camera.

In an embodiment of the present invention, which has been found to meet such requirements, one video signal representing the complete green component of the subject is transmitted in one channel and signals representing partial red and blue components of the subject are transmitted in another channel. In the case of the red and blue image components, red and blue representative video signals are transmitted in alternate line scanning intervals. The alternating red and blue video signals are combined into a single train of signals and modulated on a subcarrier wave. The product of such modulation then is combined with the green representative video signals in separate bands of the frequency spectrum. Such a composite signal then is modulated on a microwave and transmitted to the base station along with the usual deflection synchronizing signals and red and blue line-identifying signals. The combined red and blue signals are separated from the green signals at the base station where they may be processed to form signals complying with the color television transmission standards promulgated by the Federal Communications Commission (F.C.C.) and/or to recreate an image on a display device. In processing the red and blue signals at a receiving base station, the combined red and blue signals are passed through apparatus by which they are delayed by one horizontal line scanning interval. The delayed and undelayed signals then are processed by means of electronic switching apparatus controlled by the red and blue line-identifying signals to produce separate red and blue signals in each line scanning interval, In accordance with another feature of the invention, the order in which the red and blue video signals are derived from the camera pickup devices is reversed after each frame comprising two line-interlaced fields so as to minimize the appearance in a picture reproduced from such signals, of spurious motion effects commonly referred to as "line crawl."

In accordance with still another feature of the invention, the vertical scanning of the red and blue pickup devices is repetitively offset upwardly during one field scansion and downwardly during the next succeeding field scansion so as to effectively enhance the vertical resolution in a picture reproduced from such signals.

For a detailed disclosure of an illustrative embodiment of the invention, reference may be had to the following description which is taken in conjunction with the accompanying drawings of which:

Figures 1, 2:
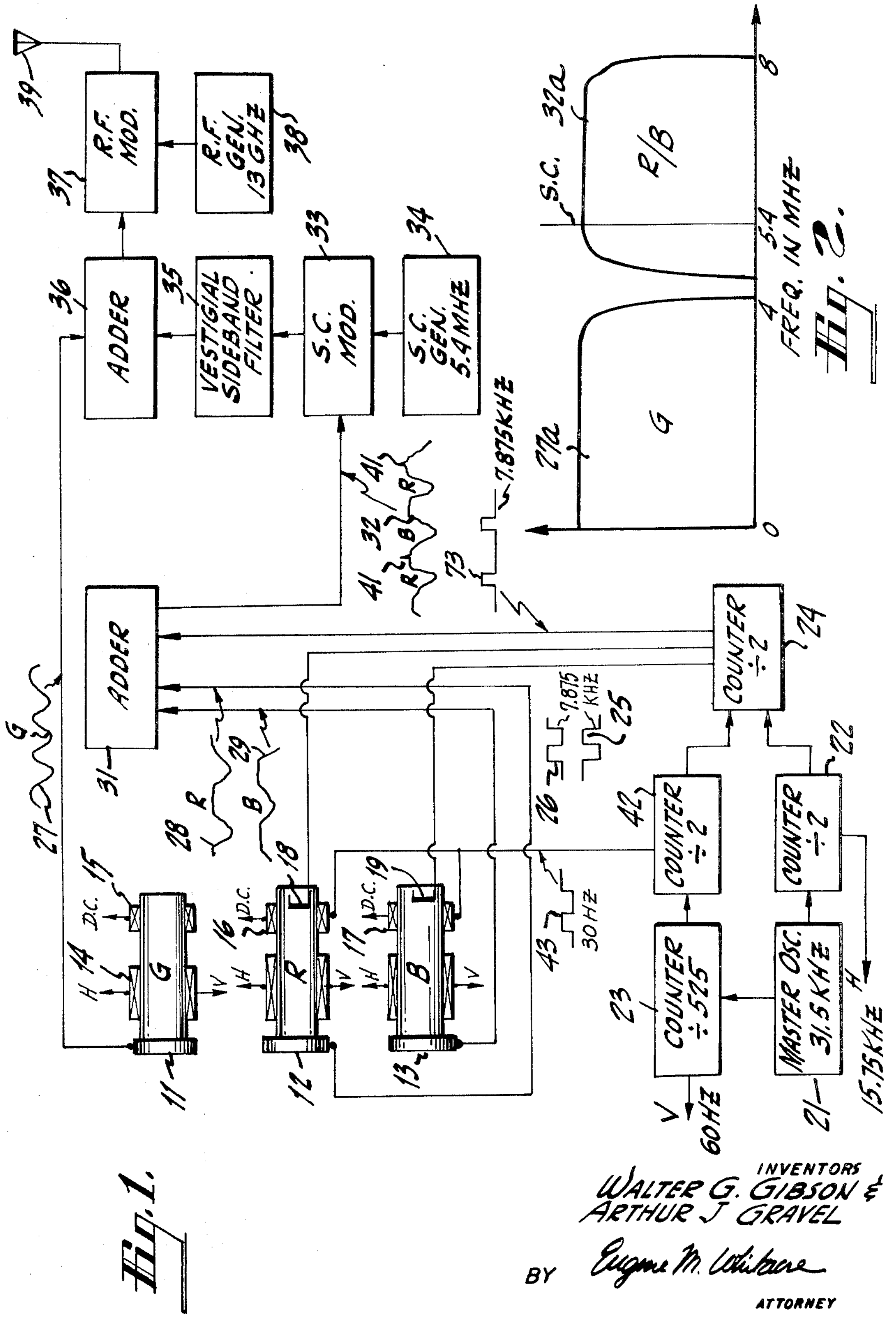
FIG. 1 is a block diagram of the essential transmitting apparatus employed at the portable television camera.
FIG. 2 is a diagram of the location of the green, red and blue signals in the frequency spectrum.

In FIG. 1 the portable camera apparatus includes green, red and blue image sensors such as vidicons 11, 12 and 13. Each of the vidicons is provided with a deflection yoke such as the yoke 14 of the green vidicon 11. The yokes are driven by suitable sawtooth deflection waves at the conventional horizontal and vertical rates.

Also, the green, red and blue vidicons 11, 12 and 13 are provided respectively with centering coils 15, 16 and 17. Each of the centering coils is energized from a direct current source which preferably is adjustable in order to center the scanning beam relative to the target of the vidicon. The centering coils 16 and 17 of the red and blue vidicons 12 and 13 are additionally energized by a periodic square wave of low amplitude for a purpose and in a manner to be subsequently described. As previously indicated, the green video signal is continuously derived from the vidicon 11. The video signals are derived from the red and blue vidicons 12 and 13 alternately on successive scanning lines. This is accomplished by keying the scanning beams of these vidicons on and off at the line repetition rate. The keying may be effected by such means as the impression of suitable biasing voltages on one of the electron gun control electrodes such as the cathodes 18 and 19 respectively of the vidicons 12 and 13.

The electron beam deflection of the vidicons 11, 12 and 13 and certain other control functions are performed by means of apparatus deriving suitable signals from a master oscillator 21, which operates at the usual double line repetition rate of 31.5 kilohertz. An output of the master oscillator 21 is impressed upon a counter 22 which divides the master oscillator pulses by 2 and produces a series of pulses at the horizontal line scanning rate of 15.75 kilohertz. Such pulses derived from the output H are conventionally used to produce sawtooth waves which are impressed upon the deflection yokes such as the yoke 14 of the green vidicon 11 as indicated. In a like manner, the output of the master oscillator 21 is impressed upon another counter 23 by which a division of 525 is affected to produce at its output terminal a series of pulses at a 60 cycle rate for use in the production of field rate sawtooth waves at output V for impression upon the deflection yokes of the vidicons 11, 12 and 13 as indicated.

Another output from the counter 22 is impressed upon another counter 24 which performs a division by 2 and produces two series of oppositely phased pulses 25 and 26 each having a frequency of 7.875 kilohertz at the output of the counter 24. The pulses 25 and 26 are impressed respectively upon the cathodes 18 and 19 of the vidicons 12 and 13 causing the red and blue vidicons to be keyed into alternate operation in successive scanning lines of the raster.

By means of the described continuous operation of the vidicon 11 and of the alternate operation of the red and blue vidicons 12 and 13, the video signals derived therefrom comprise a green video signal 27 in which video information is present during every line interval, a red video signal 28 in which video information appears only during alternate line intervals, and a blue video signal 29 which includes video information only during the alternate line intervals in which no red signal is produced. The red and blue video signals 28 and 29 are combined in an adder 31 which produces a composite red and blue video signal 32 in its output. This composite video signal 32 is impressed upon a subcarrier modulator 33 which also is provided with a subcarrier wave from a generator 34 at a frequency such as 5.4 megahertz, for example. The subcarrier wave derived from the modulator 33, which is modulated in amplitude by the composite red and blue video signal 32, is impressed upon a vestigial sideband filter 35 so as to produce a modulated subcarrier having one complete and one vestigial sideband. The modulated subcarrier, thus, has a bandwidth extending from approximately 4 megahertz to approximately 8 megahertz.

The modulated subcarrier derived from the vestigial filter 35 is impressed upon an adder 36 which also receives the green video signal 27 having a bandwidth extending from substantially zero to approximately 4 megahertz. The combined signal derived from the adder 36 is impressed upon a radio frequency modulator 37, which also receives a radio frequency carrier from an RF generator 38 having a frequency of approximately 13 gigahertz. The modulated radio frequency carrier is impressed upon an antenna 39 from which it is radiated to a base station.

FIG. 2 illustrates the allocation in the frequency spectrum of the green video signal 27*a* and the composite red and blue video signal 32*a*. It is this signal which is modulated on the radio frequency carrier for transmission to the base station.

In order that the receiver at the base station be enabled to distinguish between the red and blue video signals, line-identifying signals or flags 41 are transmitted as part of the composite red and blue signal 32. As indicated in FIG. 1, these flag signals precede each of the blue video signals. It will be understood that they may instead precede the red video signals if desired. Also, these flag signals are indicated as extending into the so-called black video signal region but may alternatively, if desired, extend into the white video signal region. These flag signals are derived from the counter 24 at one-half of the line repetition rate which is 7.875 kilohertz and are combined into the composite wave 32 by their impression upon the adder 31.

In accordance with one of the features of this invention, the order of the red and blue video signal alternation is reversed after every full frame of two picture fields. This reversal is accomplished by means of an inhibiting pulse derived from counter 42 which divides the 60 cycle output from the counter 23 by 2. The 30 cycle inhibiting pulse thus produced is impressed upon the counter 24 to cause it to either advance or retard by one pulse count as is well known in the counter art. Accordingly, after each frame of the scanning process, the phases of the keying waves 25 and 26 are reversed so as to correspondingly reverse the alternating sequence of the video signals derived from the red and blue vidicons 12 and 13.

As will be demonstrated, the reversal of the alternation between the red and blue signals after each frame has a tendency to produce undesirable visual effects such as an appearance of vertical coarseness in the red and blue portions of the image. Such undesirable visual effects may be alleviated to some extent by producing a small amount of offsetting of the vertical deflection to the scanning beams in the red and blue vidicons 12 and 13 from one field to the next. This small deflection offsetting is effected by means of a square wave 43 of small amplitude at a 30 cycle rate derived from the counter 42 and impressed upon the centering coils 16 and 17 of the vidicons 12 and 13 in addition to the direct current applied to these coils as described. This has the effect of slightly lowering the red and blue lines scanned in odd line fields and of slightly raising the red and blue lines scanned in the even line fields, for example.

Figure 3:
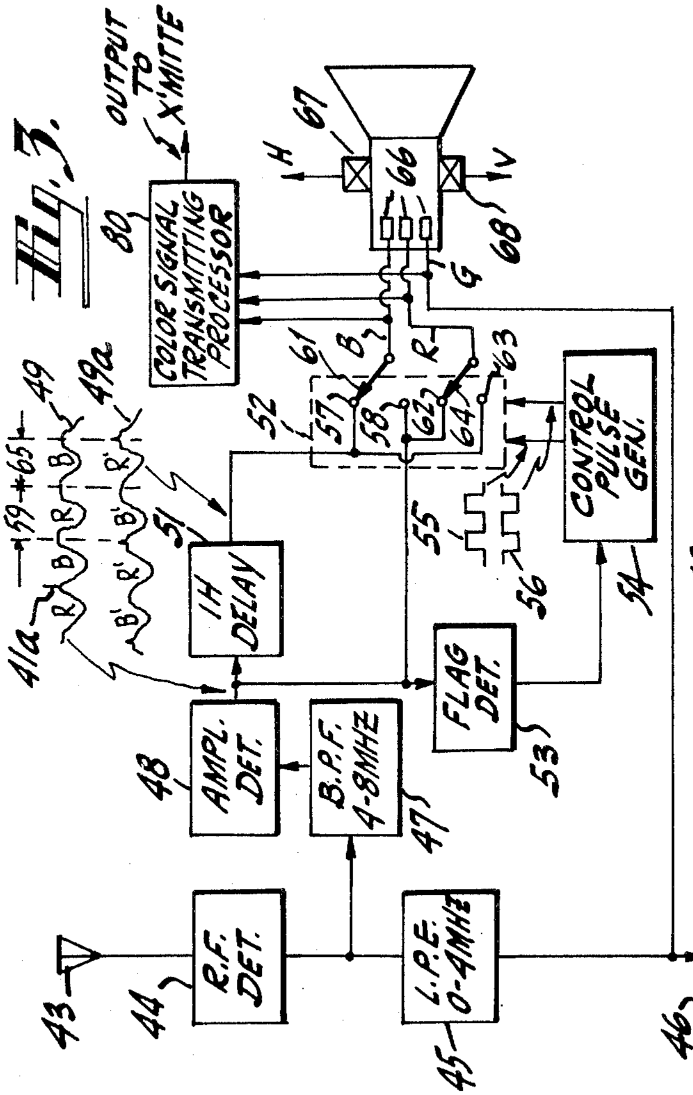
FIG. 3 is a block diagram of the essential receiving apparatus employed at a base station used in conjunction with the portable camera apparatus of FIG. 1.

The receiving apparatus at the base station shown in FIG. 3 includes an antenna 43 which intercepts the radio frequency wave radiated from the transmitting antenna 39 of FIG. 1. The received radio frequency wave is demodulated by an RF detector 44, the output of which includes a signal of the character shown in FIG. 2. This signal is impressed upon a low pass filter 45 by which the green video signal 27*a* of FIG. 1 is recovered. The output of the low pass filter 45 is also coupled to a deflection synchronizing signal separator 46 from which suitable sawtooth deflection waves H and V respectively are produced at the line and field deflection rates.

The output of the RF detector 44 also is applied to a bandpass filter 47 in the output of which there is produced the subcarrier wave 32*a* of FIG. 2. This subcarrier is demodulated by an amplitude detector 48 in the output circuit of which is produced the composite red and blue video signal 49 in which the red and blue video signals appear in alternate line scanning intervals. This composite wave also includes the received flag signal 41*a*.

The composite signal 49 is impressed upon a 1H delay device 51 which functions to delay the passage of the signal therethrough by exactly one horizontal line scanning interval to produce an output signal 49*a* in which, by comparison in time with the input signal 49, it is seen that in any line scanning interval the input and output signals respectively represent red and blue. The input and output signals 49 and 49*a* are impressed upon an electronic switch 52 which functions as a two-pole, double-throw switch. This switch is operated at the line repetition rate between the position shown and its other position by control signals derived from the flag signals 41*a*, which are recovered from the composite signal 49 by a flag detector 53 which is coupled to the output of the amplitude detector 48. The recovered flag signals derived from the detector 53 are impressed upon a control pulse generator 54 from which are derived two trains 55 and 56 of oppositely phased control pulses occurring at the line repetition rate. The control pulse trains 55 and 56 are impressed upon the electronic switch 52 and effect its operation in a manner to be more fully described subsequently.

It may be seen that, with the switch 52 in its illustrated position, the delayed and undelayed composite video signals 49*a* and 49 are impressed respectively upon switch input terminals 57 and 58. in this case, assume that the time interval 59 of the video signals 49 and 49*a* is occurring. A blue video signal is present at the terminal 57 and a red representative signal is present at the terminal 58. The blue video signal appears at the output terminal 61 of the switch 52. At the same time, a red video signal is impressed upon input terminal 62 of the switch 52 and a blue video signal is impressed upon input terminal 63. Accordingly, a red video signal is present at the output terminal 64 of the switch. In the succeeding scanning line interval 65, the switches are in their opposite positions in which the output terminal 61 is connected to the input terminal 58 and the output terminal 64 is connected to the input terminal 63. Now, it will be noted, a blue video signal is impressed upon input terminals 58 and 62 and a red video signal is impressed upon input terminals 57 and 63. Again, it is seen that there is produced at the output terminals 61 and 64 blue and red video signals respectively.

The blue and red video signals derived from the output terminals 61 and 64 of the switch 52, together with the green signal derived from the output of the low pass filter 45, are impressed upon respective electron guns 66 of a color picture tube 67. This tube may be of the shadow-mask variety commonly used in color television receivers and includes a deflection yoke 68 to which is applied sawtooth deflection waves produced from the H and V outputs of the synchronizing signal separator 46 as indicated.

There is also shown coupled to the output terminals 61 and 64 of the switch 52, and to the output of the low pass filter 45 a color signal transmitting processor 80, which in effect is in shunt with the red, green and blue, or R, G and B inputs to the kinescope or color picture tube 67.

The processor 80 serves to further operate on the blue and red video signals together with the green signal to provide at its output a signal which conforms to the F.C.C. standards, and hence contains proper timed and suitable leveled synchronization and video information. The output of the processor 80 may be coupled to a modulator or other suitable circuit, to have the proper station carrier, as a V.H.F. or U.H.F. frequency, inserted thereon which modulated signal after further amplification is used for subsequent transmission to the viewing public. For still a clearer understanding of the nature of and operations which may be performed by the processor 80 reference is made to an Instruction Book entitled "TK42 Color Camera Systems" by Radio Corporation of America, IB–31843, wherein FIG. 3 shows a block diagram of a typical color camera and enables one to note various operations which the processor 80 might further provide to the blue, red, and green or B, R and G signals coupled thereto. In any case there are numerous prior art techniques suitable to form a standard signal, which conforms to F.C.C. requirements once one has obtained the B, R and G signals, as by using the apparatus described herein.

Figure 4:
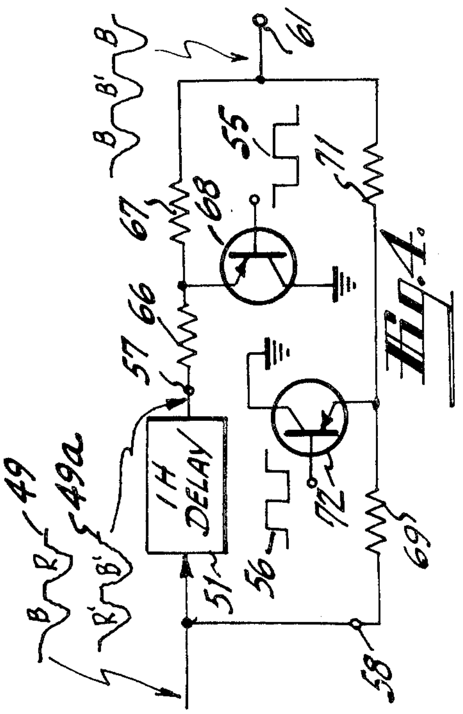
FIG. 4 is a circuit diagram showing the details of the switching apparatus of FIG. 3.

In FIG. 4 there is shown one of the elements of the electronic switch 52 of FIG. 3. Since both switch elements are the same, only one will be described. Resistors 66 and 67 are serially connected between the switch input terminal 57 and its output terminal 61. The junction point between these resistors is connected to the emitter electrode of a transistor 68 which, as illustrated, may be a PNP device, the collector electrode of which is grounded. The control pulses 55 are impressed upon the base electrode of this transistor. In a similar manner, resistors 69 and 71 are serially connected between the switch input terminal 58 and its output terminal 61. The junction point between these resistors is connected to the emitter electrode of another PNP transistor 72 of which the collector electrode is grounded. The control pulses 56 are impressed upon the base electrode of this transistor.

By means of the control pulses 55 and 56 the collector-to-emitter circuits of the respective transistors 68 and 72 are alternately rendered conducting and nonconducting at the line repetition rate. For example, when the cotrol pulse 55 is positive-goig, the transistor 68 is rendered conducting and nonconducting at the line repetition rate. For example, when the control pulse 55 is positive-going, the transistor 68 is rendered nonconducting and the delayed blue video signal 49*a* impressed upon the input terminal 57 is conducted by the resistors 66 and 67 to the output terminal 61. At the same time, the negative-going control pulse 56 renders the transistor 72 conducting. The undelayed red video signal 49 impressed at that time upon the input terminal 58 is effectively short-circuited to ground through the transistor 72 and the resistor 69. Substantially none of the undelayed red video signal traverses the resistor 71 to the output terminal 61. In the next succeeding line scanning interval the negative-going portion of the control pulse 55 renders the transistor 68 conductive, thereby effectively short-circuiting to ground the red video signal present at that time at the switch input terminal 57. At the same time the positive-going portion of the control pulse 56 renders the transistor 72 nonconducting, thereby effectively transferring the undelayed blue video signal impressed upon the input terminal 58 through the resistors 69 and 71 to the output terminal 61.

Figure 5:
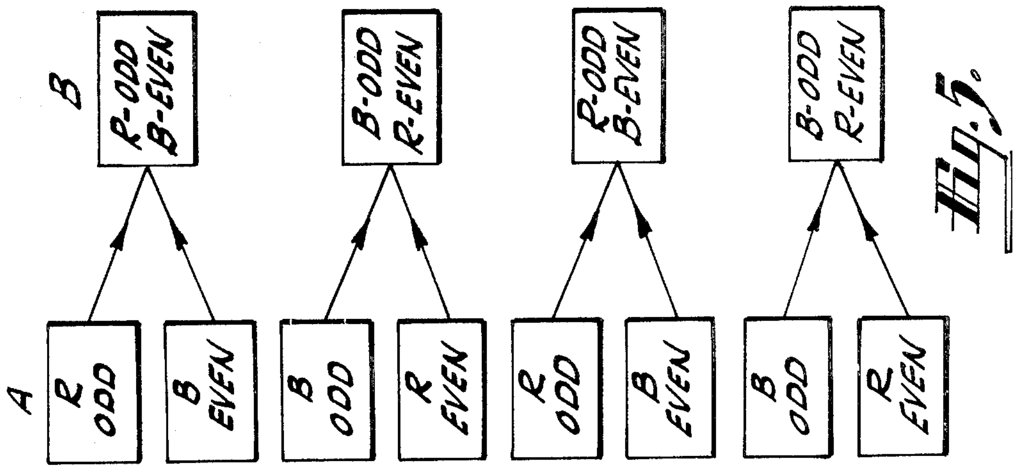
FIG. 5 is an illustration of the line structure of a display made from the signals generated by the portable camera of FIG. 1 as processed by the receiver apparatus of FIG. 3.

As previously described, the purpose of reversing the order of the alternate operation of the red and blue signal producing devices, such as the vidicons 12 and 13 of FIG. 1, is to eliminate from an image reproduced by means of signals derived in such a manner, certain objectionable visual effects commonly referred to as "line crawl." FIG. 5 indicates in column A the pattern in which the horizontal lines of the raster are scanned in the red and blue vidicons 12 and 13. It is seen that only red information is derived from raster lines 1, 4, 5, 8 etc. and only blue information is derived from raster lines 2, 3, 6, 7 etc. As a consequence, when such red and blue video signals are used to produce a picture as previously described, a coarseness in the vertical resolution is apparent. Such coarseness is caused by the lack of blue information from raster lines 1, 4, 5, 8, etc. and the lack of red information from raster lines 2, 3, 6, 7, etc. of the camera apparatus of FIG. 1.

In accordance with one of the described features of the invention, however, such information deficiency in the video signals is somewhat alleviated by means of the described offsetting of the vertical deflection of the scanning beams in the red and blue vidicons 12 and 13. The result of such deflection offsetting, as indicated in column B of FIG. 5, is to move the red and blue lines of the raster scanned by the respective electron beams upwardly during even line fields and downwardly during odd fields, for example. Thus, both red and blue information is derived from at least portions of all lines of the rasters scanned in the red and blue pickup tubes 12 and 13.

The portable color television camera provided by this invention has several novel features which render it particularly useful. One such feature is transmission of red and blue information during alternate line scanning intervals, thereby conserving bandwidth of the frequency spectrum. The derivation of video signals from the red and blue pickup devices only during alternate line scanning intervals also substantially doubles the sensitivity of such devices. Both of these features enable a reduction in the number of components needed in the camera, thereby lightening the load to be carried by the operator. Also, the feature of reversing the order of alternation between the red and blue video signal derivation alleviates an objectionable "line-crawl" in a picture reproduced from such signals. Additionally, the shifting of the scanned rasters of the pickup devices minimizes any coarseness in the vertical resolution of a reproduced picture.

It is also noted that by the use of the vertical scanning technique of the red and blue sensors the repetitive offset upwardly during one field scan and downwardly during the next succeeding field scan as mentioned previously serves to enhance vertical resolution and by the same effect also serves to reduce image flicker as signal variations are held to a minimum and hence the system described, in part, effectively serves as a flicker control.

What is claimed is:

1. A color television system comprising:

means including red, blue and green pickup devices producing video signals representative respectively of the red, blue and green color components of a subject;

means for operating said green pickup device continuously;

means for operating said red and blue pickup devices one at a time during alternate line scanning intervals;

means for combining the video signals produced by said red and blue pickup devices into a composite video signal in which the video signals in successive line scanning intervals alternately represent the red and blue color components of the subject;

means for conveying said green video signal and said composite video signal to a receiver in two separate channels;

means at said receiver for separately recovering said green and composite video signals;

means for delaying said composite video signals for one line scanning interval; and switching means for combining said delayed and undelayed composite video signals to produce separate red and blue video signals in each line scanning interval;

said green and produced separate red and blue video signals thereby substantially completely representing said subject.

2. A color television system as defined in claim 1, also including:

means for scanning said pickup devices in successive frames, each comprising two line-interlaced fields;

means for keying said red and blue pickup devices on and off in a predetermined order during alternate line scanning intervals; and means for reversing said pickup device keying order after each of said frames.

3. A color television system as defined in claim 2, wherein:

said pickup devices are cathode ray tubes including a target electrode and a source of an electron beam;

means for linearly deflecting said electron beam horizontally at a line scanning rate and vertically at a field scanning rate; and means for repetitively offsetting said vertical beam deflection in said red and blue tubes upwardly during one field scansion and downwardly during the next succeeding field scansion.

References Cited

UNITED STATES PATENTS 2,333,969 11/1943 Alexanderson ------- 178—5.2

ROBERT L. GRIFFIN, Primary Examiner

R. L. RICHARDSON, Assistant Examiner

UNITED STATES PATENT OFFICE

CERTIFICATE OF CORRECTION

Patent No. 3,518,360 Dated June 30, 1970

Inventor(s) Walter G. Gibson et al

It is certified that error appears in the above-identified patent and that said Letters Patent are hereby corrected as shown below:

Column 6, line 26, that portion reading "cotrol" should read -- control --.
Column 6, line 26, that portion reading "goig" should read -- going --.
Column 6, lines 27-29, cancel beginning with "conducting and nonconducting" to and including "68 is rendered".

SIGNED AND SEALED NOV 3 1970

(SEAL)
Attest:

Edward M. Fletcher, Jr.
Attesting Officer

WILLIAM E. SCHUYLER, JR.
Commissioner of Patents